United States Patent
Lee

(10) Patent No.: US 12,368,891 B2
(45) Date of Patent: *Jul. 22, 2025

(54) METHOD AND APPARATUS FOR ENCODING/DECODING RESIDUAL DATA BASED ON A PLURALITY OF TRANSFORMATIONS

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,849

(22) Filed: Apr. 25, 2024

(65) Prior Publication Data

US 2024/0276016 A1      Aug. 15, 2024

Related U.S. Application Data

(60) Continuation of application No. 17/970,214, filed on Oct. 20, 2022, now Pat. No. 12,003,772, which is a
(Continued)

(30) Foreign Application Priority Data

Jun. 8, 2018   (KR) .................. 10-2018-0065896

(51) Int. Cl.
*H04N 11/02*       (2006.01)
*H04N 19/132*     (2014.01)
(Continued)

(52) U.S. Cl.
CPC ......... *H04N 19/60* (2014.11); *H04N 19/132* (2014.11); *H04N 19/176* (2014.11); *H04N 19/88* (2014.11)

(58) Field of Classification Search
CPC ...................................... H04N 19/60
(Continued)

(56) References Cited

U.S. PATENT DOCUMENTS

| | | | |
|---|---|---|---|
| 2011/0090952 A1* | 4/2011 | Cohen | H04N 19/12 375/240.2 |
| 2012/0128066 A1 | 5/2012 | Shibahara et al. | |

(Continued)

FOREIGN PATENT DOCUMENTS

| | | |
|---|---|---|
| AU | 2016200532 B2 | 8/2017 |
| CN | 101065796 A | 10/2007 |

(Continued)

OTHER PUBLICATIONS

China National Intellectual Property Administration, Notice of Allowance of corresponding CN Patent Application No. 201980035163. 4, Jul. 25, 2024.
(Continued)

*Primary Examiner* — Leron Beck
(74) *Attorney, Agent, or Firm* — IP Legal Services, LLC

(57) ABSTRACT

An image decoding method according to the present invention can comprise the steps of: acquiring residual coefficients of a current block; dequantizing the residual coefficients; performing secondary inverse transformation on the dequantized residual coefficients; and performing primary inverse transformation on the performance result of the secondary inverse transformation. The secondary inverse transformation can be performed for a partial region of the current block.

7 Claims, 8 Drawing Sheets

Related U.S. Application Data division of application No. 17/056,961, filed as application No. PCT/KR2019/006905 on Jun. 7, 2019, now Pat. No. 11,533,508.

(51) Int. Cl.
*H04N 19/176* (2014.01)
*H04N 19/60* (2014.01)
*H04N 19/88* (2014.01)

(58) Field of Classification Search
USPC .................................................. 375/240.18
See application file for complete search history.

(56) References Cited

U.S. PATENT DOCUMENTS

| | | | |
|---|---|---|---|
| 2013/0003856 A1* | 1/2013 | Saxena | H04N 19/12 375/240.18 |
| 2013/0215960 A1 | 8/2013 | Song et al. | |
| 2014/0016700 A1 | 1/2014 | Henry et al. | |
| 2014/0247866 A1 | 9/2014 | Lee et al. | |
| 2014/0269909 A1 | 9/2014 | Oh et al. | |
| 2015/0010088 A1 | 1/2015 | Henry et al. | |
| 2015/0131739 A1 | 5/2015 | Lee et al. | |
| 2015/0139308 A1 | 5/2015 | Lee et al. | |
| 2015/0264403 A1* | 9/2015 | Chong | H04N 19/176 375/240.18 |
| 2016/0142733 A1 | 5/2016 | Henry et al. | |
| 2016/0173873 A1 | 6/2016 | Oh et al. | |
| 2016/0173877 A1 | 6/2016 | Oh et al. | |
| 2016/0173878 A1 | 6/2016 | Oh et al. | |
| 2016/0249051 A1 | 8/2016 | Oh et al. | |
| 2017/0142441 A1 | 5/2017 | Henry et al. | |
| 2017/0257645 A1 | 9/2017 | Thiagarajan et al. | |
| 2018/0020218 A1 | 1/2018 | Zhao et al. | |
| 2018/0070106 A1 | 3/2018 | Han et al. | |
| 2018/0084253 A1 | 3/2018 | Thiagarajan et al. | |
| 2018/0084279 A1 | 3/2018 | Thiagarajan et al. | |
| 2018/0084280 A1 | 3/2018 | Thiagarajan et al. | |
| 2018/0199038 A1 | 7/2018 | Oh et al. | |
| 2018/0309991 A1 | 10/2018 | Thiagarajan et al. | |
| 2018/0332289 A1 | 11/2018 | Huang | |
| 2019/0007705 A1* | 1/2019 | Zhao | H04N 19/61 |
| 2019/0052879 A1 | 2/2019 | Oh et al. | |
| 2019/0141319 A1 | 5/2019 | Moon et al. | |
| 2019/0222864 A1 | 7/2019 | Thiagarajan et al. | |
| 2019/0238835 A1 | 8/2019 | Lee | |
| 2019/0273947 A1 | 9/2019 | Henry et al. | |
| 2019/0313102 A1 | 10/2019 | Cho et al. | |
| 2019/0313123 A1 | 10/2019 | Han et al. | |
| 2019/0335173 A1* | 10/2019 | Moon | H04N 19/159 |
| 2019/0335178 A1 | 10/2019 | Oh et al. | |
| 2019/0387241 A1* | 12/2019 | Kim | H04N 19/60 |
| 2020/0021828 A1 | 1/2020 | Cho et al. | |
| 2020/0280740 A1* | 9/2020 | Tsukuba | H04N 19/70 |
| 2020/0329234 A1 | 10/2020 | Lee | |
| 2021/0021867 A1 | 1/2021 | Henry et al. | |
| 2021/0067794 A1 | 3/2021 | Cho et al. | |
| 2021/0105459 A1 | 4/2021 | Lee | |
| 2021/0105460 A1 | 4/2021 | Lee | |
| 2021/0105461 A1 | 4/2021 | Lee | |
| 2023/0007829 A1 | 1/2023 | Cho et al. | |

FOREIGN PATENT DOCUMENTS

| | | |
|---|---|---|
| CN | 103108177 A | 5/2013 |
| KR | 10-2013-0050407 A | 5/2013 |
| KR | 10-2018-0041578 A | 4/2018 |
| RU | 2598817 C2 | 9/2016 |
| WO | 2012/011714 A2 | 1/2012 |
| WO | 2014/107073 A1 | 7/2014 |
| WO | 2017/222326 A1 | 12/2017 |
| WO | 2018/026118 A1 | 2/2018 |
| WO | 2018/097691 A2 | 5/2018 |
| WO | 2018/101687 A1 | 6/2018 |
| WO | 2018/097691 A3 | 7/2018 |

OTHER PUBLICATIONS

Federal Institute of Industrial Property, Office Action of corresponding RU Patent Application No. 2020137805, Aug. 18, 2022.
Intellectual Property India, Examination Report of corresponding Indian Patent Application No. 202017048656, Sep. 9, 2022.
Jianle Chen et al., "Algorithm Description of Joint Exploration Test Model 7 (JEM 7)", Document: JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017.
Amir Said et al., "Non-Separable Secondary Transform Implementations with Reduced Memory via Hierarchically Structured Matrix-based Transforms", Document: JVET-J0062-v3, Joint Video Experts Team (JVET) of ITU-T SG 16 WP 3 and ISO/IEC JTC 1/SC 29/WG 11, 10th Meeting: San Diego, US, Apr. 10-20, 2018, pp. 1-3.
Xin Zhao et al., "Coupled primary and secondary transform", Document: JVET-J0054-v2, Joint Video Experts Team (JVET) of ITU-T SG 16 WP 3 and ISO/IEC JTC 1/SC 29/WG 11 10th Meeting: San Diego, US, Apr. 10-20, 2018.
China National Intellectual Property Administration, Office Action of corresponding CN Patent Application No. 201980035163.4, Feb. 1, 2024.
Intellectual Property India, Hearing Notice of corresponding Indian Patent Application No. 202017048656, Mar. 19, 2024.
Canadian Intellectual Property Office, Office Action of corresponding Canadian Patent Application No. 3100976, Jan. 23, 2025.

* cited by examiner

Nx2N

2NxN nLx2N nRx2N

2NxnU

2NxnD

METHOD AND APPARATUS FOR ENCODING/DECODING RESIDUAL DATA BASED ON A PLURALITY OF TRANSFORMATIONS

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for encoding/decoding residual data based on a plurality of transformations.

An object of the present invention is to provide a method and an apparatus for performing the secondary transformation on a partial region of a block on which the primary transformation has been performed.

The technical objects to be achieved by the present invention are not limited to the above-mentioned technical problems. And, other technical problems that are not mentioned will be apparently understood to those skilled in the art from the following description.

Technical Solution

A video signal decoding method and apparatus according to the present invention may acquire residual coefficients of a current block, inverse quantize the residual coefficients, perform a secondary inverse transformation on the inverse quantized residual coefficients, and perform a primary inverse transformation on a result of performing the secondary inverse transformation. In this case, the secondary inverse transformation is performed on a partial region of the current block.

A video signal encoding method and apparatus according to the present invention may perform a primary transformation on residual samples, perform a secondary transformation on primary transform coefficients generated as a result of the primary transformation, quantize secondary transform coefficients generated as a result of the secondary transformation, and encode the quantized transform coefficients. In this case, the secondary transformation is performed on a partial region of a current block.

In the method and apparatus for encoding/decoding a video signal according to the present invention, the secondary transformation/inverse transformation is performed using a transform matrix and a one-dimensional matrix generated by arranging the inverse quantized residual coefficients included in the partial region in one dimension.

In the method and apparatus for encoding/decoding a video signal according to the present invention, a number of rows or columns of the transform matrix is smaller than a number of samples included in the partial region.

In the method and apparatus for encoding/decoding a video signal according to the present invention, a size or shape of the partial region is determined based on a size or shape of the current block.

In the method and apparatus for encoding/decoding a video signal according to the present invention, a transform/inverse transform type for the primary inverse transformation is determined based on index information signaled through a bitstream.

In the method and apparatus for encoding/decoding a video signal according to the present invention, the index information specifies any one of a plurality of transform sets, a first transform type candidate included in the transform set is determined as a horizontal direction transform type of the current block, and a second transform type candidate included in the transform set is determined as a vertical direction transform type of the current block.

In the method and apparatus for encoding/decoding a video signal according to the present invention, a transform type for the primary transformation/inverse transformation is determined based on a result of comparing a width of the current block and a height of the current block.

The features briefly summarized above for the present invention are only illustrative aspects of the detailed description of the invention that follows, but do not limit the scope of the invention.

Advantageous Effects

According to the present invention, encoding/decoding efficiency of residual data can be improved by performing a plurality of transformations on the residual data.

According to the present invention, encoding/decoding efficiency can be improved by performing the secondary transformation on a partial region of a block on which the primary transformation has been performed.

The effects obtainable by the present invention are not limited to the above-mentioned effects, and other effects not mentioned can be clearly understood by those skilled in the art from the description below.

MODE FOR INVENTION

Figure 1:
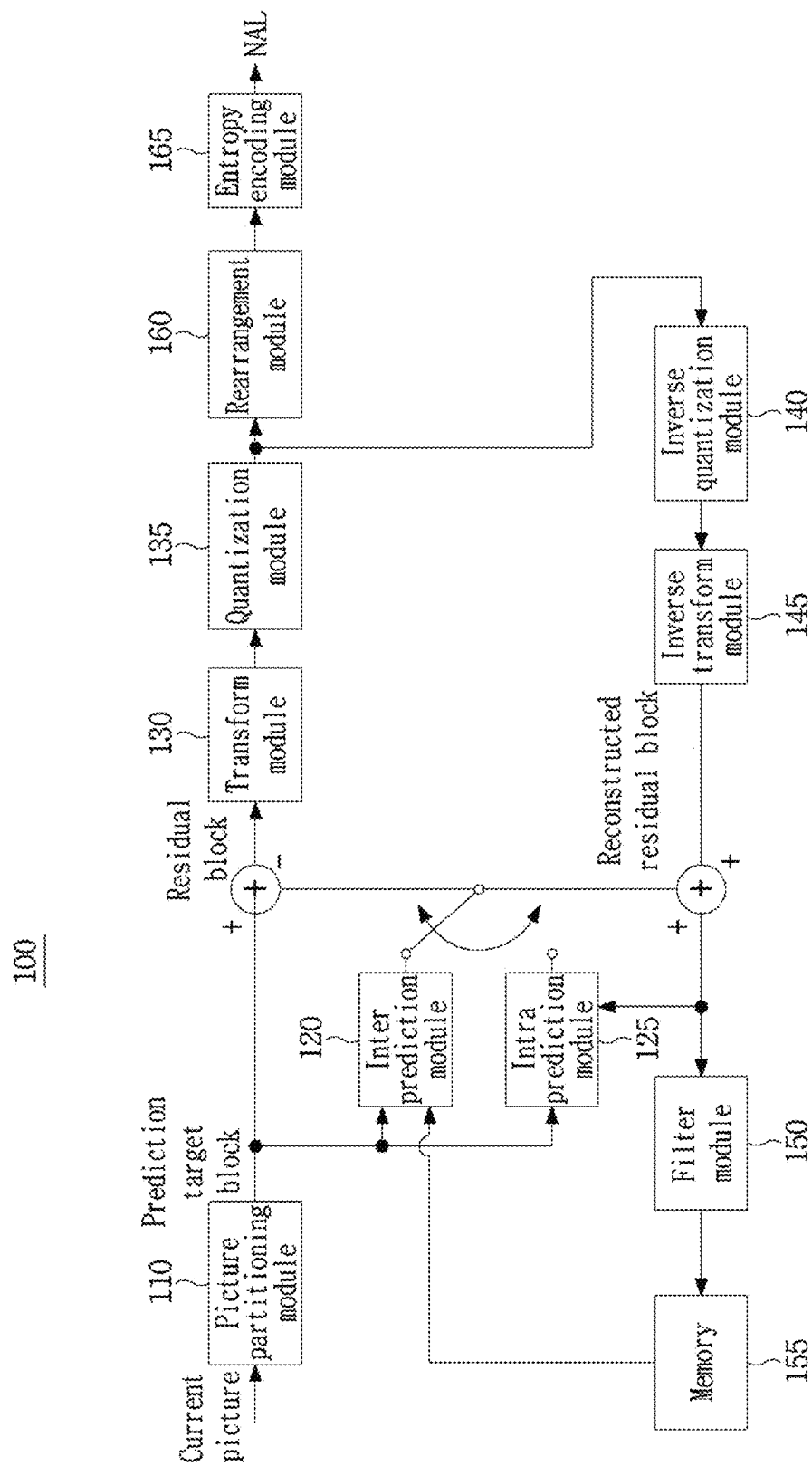
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being 'directly coupled' or 'directly connected' to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as 'including', 'having', etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, or an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
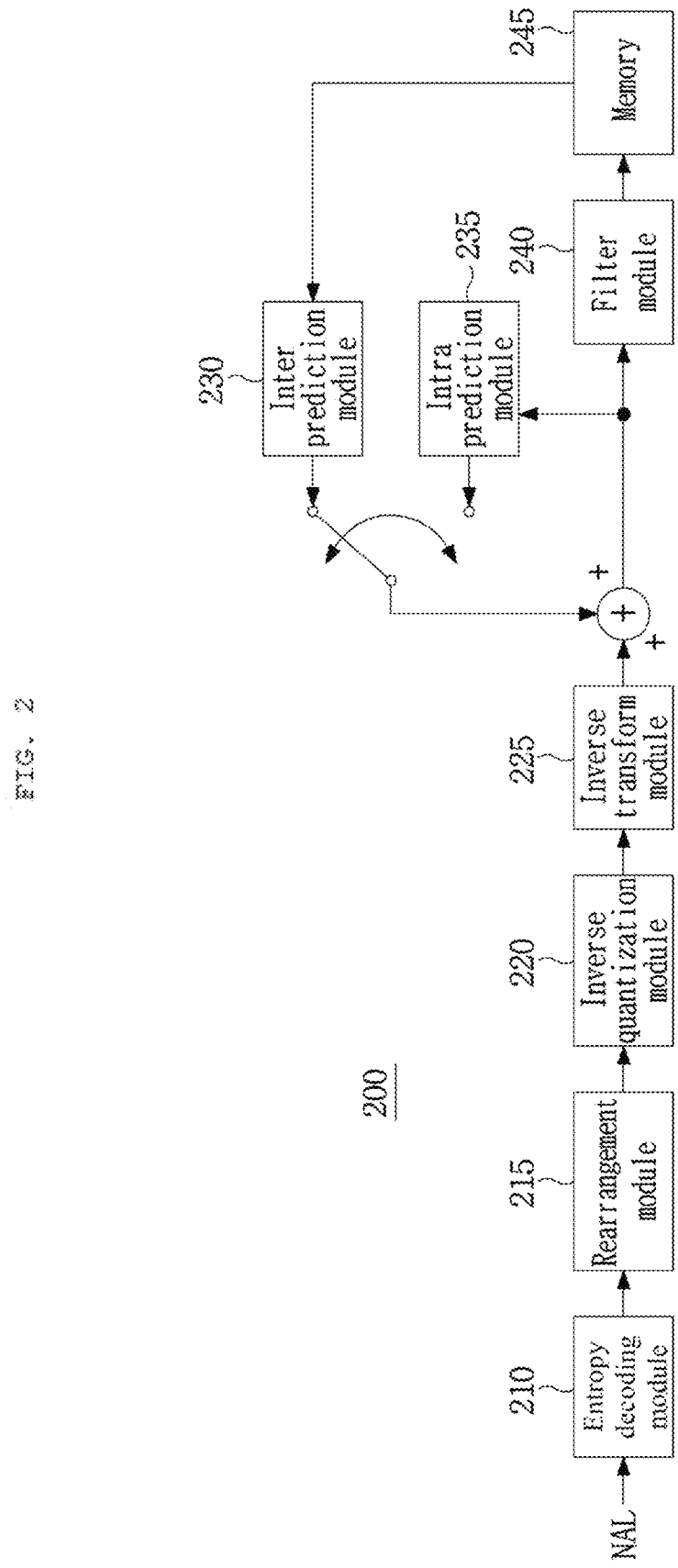
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step. In this specification, 'unit' represents a basic unit for performing a specific encoding/decoding processes, and 'block' may represent a sample array of a predetermined size. If there is no distinguish between them, the terms 'block' and 'unit' may be used interchangeably. For example, in the embodiments described below, it can be understood that a coding block and a coding unit have mutually equivalent meanings.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transformation, or in-loop filtering, and the like. For example, a partition of arbitrary size generated by dividing the coding unit may be defined as a coding unit, or may be defined as a transform unit or a prediction unit, which is a base unit for performing prediction, quantization, transformation or in-loop filtering and the like.

Alternatively, a prediction block having the same size as the coding block or smaller than the coding block may be determined through predictive partitioning of the coding block. For predictive partitioning of the coding block, one of partition mode (Part_mode) candidates may be specified. Information for determining a partition index indicating one of the partition mode candidates may be signaled via bitstream. Alternatively, a partition index of the coding block may be determined based on at least one of a size, shape or encoding mode of the current block. A size or shape of a prediction block may be determined based on a partition mode specified by the partition index. The partition mode candidates may include an asymmetric partition type (for example, nL×2N, nR×2N, 2N×nU, 2N×nD). The number or type of asymmetric partition mode candidates available to the coding block may be determined based on a size, shape or encoding mode of the current block.

Figure 3:
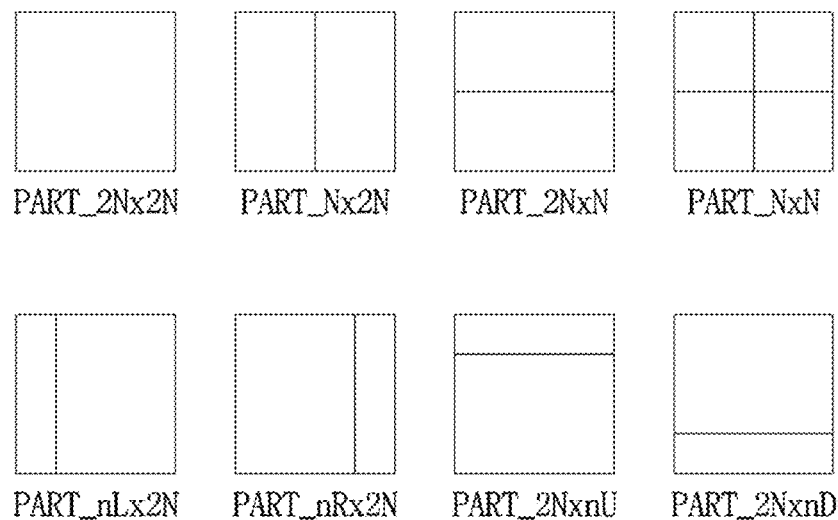
FIG. 3 is a diagram illustrating partition mode candidates that can be applied to a coding block when the coding block is encoded by inter prediction.

FIG. 3 illustrates partition mode candidates that can be applied to a coding block when the coding block is encoded by inter prediction.

When the coding block is encoded using inter prediction, any one of eight partition mode candidates shown in FIG. 3 is applied to the coding block.

Conversely, when the coding block is encoded using intra prediction, only partitioning of a square-shape partition is applied to the coding block. That is, when the coding block is encoded using intra prediction, a partition mode PART_2N×2N or PART_N×N is applied to the coding block.

The partition mode PART_N×N is applied when the coding block is in a minimum size. Herein, the minimum size of the coding block may be predefined in the encoder and the decoder. Alternatively, information on the minimum size of the coding block may be signaled through a bitstream. For example, the minimum size of the coding block may be signaled through a slice header. Accordingly, different minimum sizes of the coding block may be determined for respective slices.

As another example, partition mode candidates that the coding block is able to use may be set different according to at least one among the size and the shape of the coding block. For example, the numbers or types of partition mode candidates that the coding block is able to use may be set different according to at least one among the size and the shape of the coding block.

Alternatively, on the basis of the size or the shape of the coding block, types or the number of asymmetric partition mode candidates that the coding block is able to use may be determined. The number or types of asymmetric partition mode candidates that the coding block is able to use may be set different according to at least one among the size and the shape of the coding block. For example, when the coding block is in a non-square shape of which the width is greater than the height, at least one of partition modes PART_2N×N, PART_2N×nU, or PART_2N×nD is not used as a partition mode candidate of the coding block. When the coding block is in a non-square shape of which the height is greater than the width, at least one of partitions modes PART_N×2N, PART_nL×2N, or PART_nR×2N is not used as a partition mode candidate of the coding block.

In general, the size of the prediction block ranges from a size of 64×64 to a size of 4×4. However, in the case where the coding block is encoded using inter prediction, in order to reduce the memory bandwidth when performing motion compensation, a prediction block is set not to be in a 4×4 size.

On the basis of the partition mode, the coding block may be partitioned in a recursive manner. That is, on the basis of a partition mode determined by a partition index, the coding block may be partitioned, and each partition generated as a result of partitioning the coding block may be defined as a coding block.

Hereinafter, a method of partitioning the coding unit will be described in more detail. In an embodiment described later, a coding unit may refer to a coding tree unit or a coding unit included in a coding tree unit. In addition, the 'partitions' generated as a result of partitioning the coding block may refer to 'coding blocks'. The partitioning method described below may be applied to partitioning the coding block into a plurality of prediction blocks or a plurality of transform blocks.

The coding unit may be partitioned by at least one line. Herein, the angle of the line that partitions the coding unit has a value within a range from 0 degrees to 360 degrees. For example, the angle of the horizontal line may be a 0 degree angle, the angle of the vertical line may be a 90 degree angle, the angle of the diagonal line in a right upward direction may be a 45 degree angle, and the angle of the diagonal line in a left upward direction may be a 135 degree angle.

When the coding unit is partitioned by multiple lines, the multiple lines are at the same angle. Alternatively, at least one of the multiple lines may be at a different angle from another line. Alternatively, the multiple lines that partition the coding tree unit or the coding unit may have a predefined difference in angle (for example, a 90 degree angle).

Information on a line partitioning the coding unit may be determined by a partition mode. Alternatively, information on at least one among the number of lines, a direction, an angle, and a position of a line within a block may be encoded.

For convenience of description, in an embodiment described later, it is assumed that a coding unit is partitioned into multiple coding units by using at least one among a vertical line and a horizontal line.

The number of vertical lines or horizontal lines that partition the coding unit may be at least one. For example, the coding unit may be partitioned into two partitions by using one vertical line or one horizontal line. Alternatively, the coding unit may be partitioned into three partitions by using two vertical lines or two horizontal lines. Alternatively, by using one vertical line and one horizontal line, the coding unit may be partitioned into four partitions, wherein each of the four partitions has the width and the height that are ½ of those of the coding unit.

When the coding unit is partitioned into multiple partitions by using at least one vertical line or at least one horizontal line, the partitions are in the uniform sizes. Alternatively, any one partition may be in a different size from the other partitions, or partitions may be in different sizes, respectively. For example, when the coding unit is partitioned with two horizontal lines or two vertical lines, the coding unit is partitioned into three partitions. Herein, a width ratio or a height ratio of the three partitions may be n:2n:n, 2n:n:n, or n:n:2n.

In embodiments described later, partitioning the coding unit into four partitions is referred to as quad tree-based partitioning. In addition, partitioning the coding unit into two partitions is referred to as binary tree-based partitioning. In addition, partitioning the coding unit into three partitions is referred to as triple tree-based partitioning.

In the drawings described later, it is shown that one vertical line and/or one horizontal line is used to partition the coding unit. However, it is also included in the scope of the present invention that by using a larger number of vertical lines and/or horizontal lines than the lines shown in the drawings, the coding unit is partitioned into a larger or smaller number of partitions than the partitions shown in the drawings.

Figure 4:
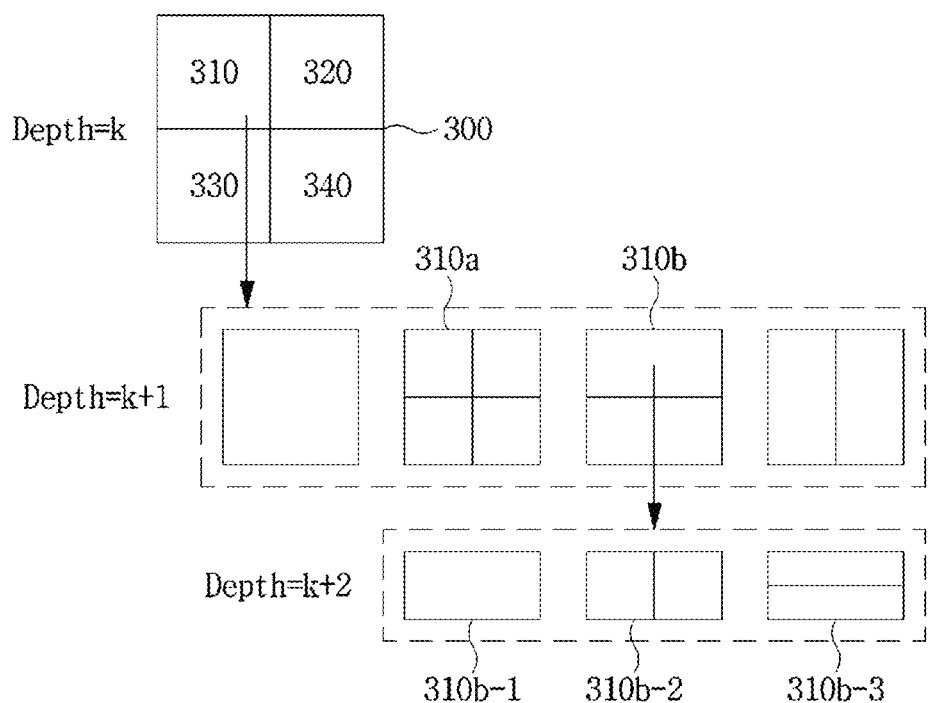
FIG. 4 is a diagram illustrating an example of hierarchically partitioning a coding block based on a tree structure according to an embodiment of the present invention.

FIG. 4 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transformation, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree partitioning method, a binary tree partitioning method, or a triple tree partitioning method. The quad tree-based partitioning may mean that a 2N×2N coding block is partitioned into four N×N coding blocks. The binary tree-based partitioning may mean that one coding block is partitioned into two coding blocks. The triple tree-based partitioning may mean that one coding block is partitioned into three coding blocks. Even if the binary tree-based partitioning or the triple tree-based partitioning is performed, a square-shaped coding block may exist in the lower depth.

The partitions generated through binary tree-based partitioning may be in a symmetric shape or an asymmetric shape. In addition, a coding block resulting from binary tree-based partitioning may be a square block or a non-square block (for example, a rectangular block).

Figure 5:
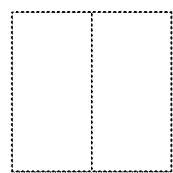
FIG. 5 is a diagram illustrating a partition type in which binary tree-based partitioning is allowed according to an embodiment of the present invention.
Figure 5:
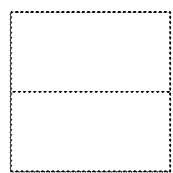
Figure 5:
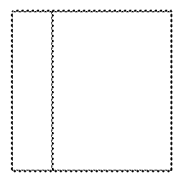
Figure 5:
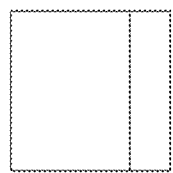
Figure 5:
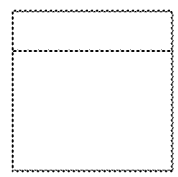
Figure 5:
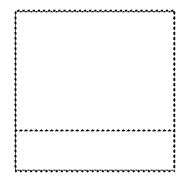

FIG. 5 is a diagram illustrating partition types of a coding block based on binary-tree partitioning. A partition shape of a coding block based on binary-tree partitioning may include a symmetric type, such as 2N×N (a horizontal non-square coding unit), N×2N (a vertical non-square coding unit), or the like, or an asymmetric type, such as nL×2N, nR×2N, 2N×nU, 2N×nD, or the like. Any one among the symmetric type or the asymmetric type is allowed as a partition type of the coding block.

Triple tree-based partitioning type may include at least one of a type in which a coding block is partitioned by two vertical lines or a type in which the coding block is partitioned by two horizontal lines. Three non-square partitions may be generated by the triple tree-based partitioning.

Figure 6:
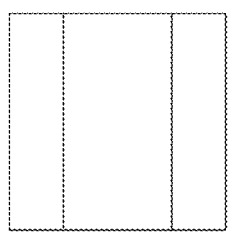
FIG. 6 is a diagram illustrating a triple tree-based partitioning type.
Figure 6:
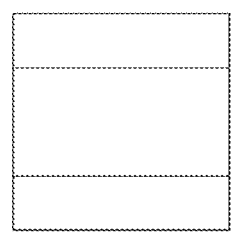

FIG. 6 is a diagram illustrating a triple tree-based partitioning type.

The triple tree-based partitioning may include a type of partitioning a coding block with two horizontal lines or a type of partitioning a coding block with two vertical lines. A width ratio or a height ratio of partitions generated as a result of partitioning the coding block may be n:2n:n, 2n:n:n, or n:n:2n.

A position of a partition having the largest width or height among three partitions may be predefined in the encoder and decoder. Alternatively, information indicating the partition having the largest width or height among the three partitions may be signaled through a bitstream.

Only partitioning in a square shape or a non-square symmetric shape is allowed for the coding unit. In this case, partitioning the coding unit into square partitions may correspond to quad-tree CU partitioning, and partitioning the coding unit into symmetric non-square partitions may correspond to binary-tree partitioning. Partitioning a coding tree unit into square partitions and symmetric non-square partitions may correspond to quad-tree and binary-tree CU partitioning (QTBT).

Binary tree-based partitioning or triple tree-based partitioning may be performed on a coding block for which quad tree-based partitioning is no longer performed. A coding block generated as a result of binary tree-based partitioning or triple tree-based partitioning may be partitioned into smaller coding blocks. In this case, the coding block may be set so that at least one of quad tree-based partitioning, triple tree-based partitioning, or binary tree-based partitioning is not applied to the coding block. Alternatively, binary tree-based partitioning in a predetermined direction or triple tree-based partitioning in a predetermined direction may not be allowed in the coding block. For example, quad tree-based partitioning and triple tree-based partitioning may not be allowed in a coding block generated as a result of binary tree-based partitioning or triple tree-based partitioning. Only binary tree-based partitioning may be allowed in the coding block.

Alternatively, only a coding block having the largest size among three coding blocks generated as a result of triple tree-based partitioning may be partitioned into coding blocks having a smaller size. Alternatively, binary tree-based partitioning or triple tree-based partitioning may be allowed only for the coding block having the largest size among three coding blocks generated as a result of the triple tree-based partitioning.

In addition, a type of partitioning a child depth partition may be determined dependently on a partition type of a parent depth partition. For example, when a parent partition and a child partition are partitioned on the basis of a binary tree, only binary tree-based partitioning of the same type as a binary-tree partition type of a parent depth partition is allowed in a child depth partition. For example, when the binary-tree partition type of the parent depth partition is a 2N×N type, the binary-tree partition type of the child depth partition is also set to be a 2N×N type. Alternatively, when the binary-tree partition type of the parent depth partition is an N×2N type, the partition type of the child depth partition is also set to be an N×2N type.

Alternatively, a partition with the largest size among partitions generated as a result of triple tree-based partitioning may be configured not to allow binary tree-based partitioning in the same direction as a partitioning direction of a parent depth partition or triple tree-based partitioning in the same direction as a partitioning direction of a parent depth partition.

Alternatively, a partition type of a child depth partition may be determined considering a partition type of a parent depth partition and a partition type of a neighboring child depth partition. Specifically, when a parent depth partition is partitioned on the basis of a binary tree, a partition type of a child depth partition is determined in such a manner as not to generate the same result as a result of partitioning the parent depth partition on the basis of a quad tree. For example, when the partition type of the parent depth partition is 2N×N and the partition type of the neighboring child depth partition is N×2N, a partition type of a current child depth partition is not set to N×2N. This is because, when the partition type of the current child depth partition is N×2N, the same result as a result of N×N-type quad-tree partitioning the parent depth partition is caused. When the partition type of the parent depth partition is N×2N and the partition type of the neighboring child depth partition is 2N×N, a partition type of a current child depth partition is not set to 2N×N. That is, when a binary-tree partition type of a parent depth partition is different from a binary-tree partition type of a neighboring child depth partition, a binary-tree partition type of a current child depth partition is set the same as the binary-tree partition type of the parent depth partition.

Alternatively, a binary-tree partition type of a child depth partition may be set different from a binary-tree partition type of a parent depth partition.

An allowable binary-tree partition type may be determined on a per-sequence basis, a per-slice basis, or a per-coding unit basis. For example, a binary-tree partition type allowable for the coding tree unit may be limited to a 2N×N or N×2N type. The allowable partition type may be predefined in the encoder or the decoder. Alternatively, information on an allowable partition type or an unallowable partition type may be encoded and signaled through a bitstream.

Figure 7:
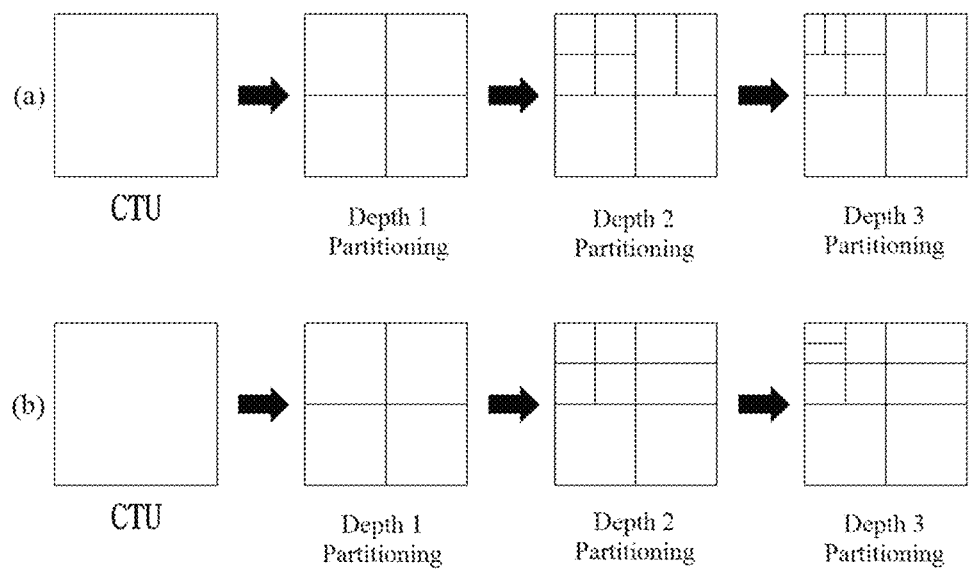
FIG. 7 is a diagram illustrating an example in which only a specific type of binary tree-based partitioning is allowed.

FIG. 7 is a diagram illustrating an example in which only a specific type of binary tree-based partitioning is allowed.

(a) of FIG. 7 shows an example in which only N×2N type of binary tree-based partitioning is allowed, and (b) of FIG. 7 shows an example in which only 2N×N type of binary tree-based partitioning is allowed.

In order to represent various types of partitioning, information on quad tree-based partitioning, information on binary tree-based partitioning, or information on triple tree-based partitioning may be used. The information on quad tree-based partitioning may include at least one of information indicating whether quad tree-based partitioning is performed or information on a size/depth of a coding block in which quad tree-based partitioning is allowed. The information on binary tree-based partitioning may include at least one of information indicating whether binary tree-based partitioning is performed, information indicating whether binary tree-based partitioning is performed in a vertical direction or horizontal direction, information on a size/depth of a coding block in which binary tree-based partitioning is allowed, or information on a size/depth of a coding block in which binary tree-based partitioning is not allowed. The information on triple tree-based partitioning may include at least one of information indicating whether triple tree-based partitioning is performed, information indicating whether triple tree-based partitioning is performed in a vertical direction or horizontal direction, information on a size/depth of a coding block in which triple tree-based partitioning is allowed, or information on a size/depth of a coding block in which triple tree-based partitioning is not allowed. Information on a size of a coding block may indicate a minimum value or a maximum value of at least one of a width, a height, a product of a width and a height, or a ratio of a width and height of the coding block.

For example, when a width or height of a coding block is less than a minimum size allowed for binary tree-based partitioning, or when a partitioning depth of a coding block is greater than a maximum depth allowed for binary tree-based partitioning, binary tree-based partitioning may not be allowed for the coding block.

For example, when a width or height of a coding block is less than a minimum size allowed for triple tree-based partitioning, or when a partitioning depth of a coding block is greater than a maximum depth allowed for triple tree-based partitioning, triple tree-based partitioning may not be allowed for the coding block.

Information on an allowable condition for binary tree-based or triple tree-based partitioning may be signaled through a bitstream. The information may be encoded in a unit of a sequence, picture, or fragment image. The fragment image may mean at least one of a slice, a tile group, a tile, a brick, a coding block, a prediction block, or a transform block.

For example, through a bitstream, a syntax 'max_mtt_depth_idx_minus1' indicating a maximum depth in which binary tree/triple tree partitioning is allowed may be encoded/decoded through the bitstream. In this case, max_mtt_depth_idx_minus1+1 may indicate a maximum depth in which binary tree/triple tree partitioning is allowed.

For example, at least one of the number of times binary tree/triple tree partitioning is allowed, a maximum depth that binary tree/triple tree partitioning is allowed, or the number of depths allowed for binary tree/triple tree partitioning is signaled at a sequence or slice level. Accordingly, at least one of the number of binary tree/triple tree partitioning times, a maximum depth allowed for binary tree/triple tree partitioning, or the number of depths allowed for binary tree/triple tree partitioning of the first slice and the second slice may be different. For example, in the first slice, binary tree/triple tree partitioning may be allowed in only one depth, whereas in the second slice, binary tree/triple tree partitioning may be allowed in two depths.

Figure 8:
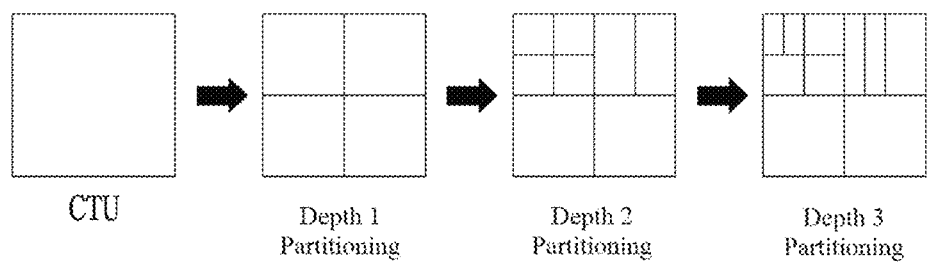
FIG. 8 is a diagram illustrating an example in which information related to the allowed number of binary tree-based partitioning is encoded/decoded as an embodiment to which the present invention is applied.

Referring to the example shown in FIG. 8, in FIG. 8, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth of a partition which is generated by the binary tree partitioning in the coding tree unit (i.e., depth 3), or the number of partition depths in which the binary tree partitioning has been applied in the coding tree unit (i.e., 2 (depth 2 and depth 3)) may be encoded/decoded through a bitstream.

Alternatively, the number of times binary tree/triple tree partitioning is allowed, a depth at which binary tree/triple tree partitioning is allowed, or the number of depths at which binary tree/triple tree partitioning is allowed may be pre-defined in the encoder and decoder. Alternatively, based on at least one of an index of a sequence or slice or a size/shape of a coding unit, the number of times binary tree/triple tree partitioning is allowed, a depth at which binary tree/triple tree partitioning is allowed, or the number of depths at which binary tree/triple tree partitioning is allowed may be determined. For example, in the first slice, binary tree/triple tree partitioning may be allowed for only one depth, while in the second slice, binary tree/triple tree partitioning may be allowed for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 4, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning or the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, or the information on the size/depth of the coding block that binary tree-based partitioning is not allowed.

The number of candidate sizes may be limited to a predetermined number, or a size of a coding block in a predetermined unit may have a fixed value. As an example, the size of the coding block in a sequence or in a picture may be forced to have one of 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

As shown in FIG. 4, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning or the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, or the information on the size/depth of the coding block that binary tree-based partitioning is not allowed.

The number of candidate sizes may be limited to a predetermined number, or a size of a coding block in a predetermined unit may have a fixed value. As an example, the size of the coding block in a sequence or in a picture may be forced to have one of 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

As a result of partitioning based on a quad tree, a binary tree, or triple tree, a coding block that is no longer partitioned may be used as a prediction block or a transform block. That is, it may be used as a coding block generated as a result of quad-tree partitioning or binary-tree partitioning, a prediction block or a transform block. For example, a prediction image may be generated on a per-coding block basis, and a residual signal that is a difference between an original image and a prediction image may be transformed on a per-coding block basis. In order to generate a prediction image on a per-coding block basis, motion information may be determined on the basis of a coding block, or an intra prediction mode may be determined on the basis of a coding block. Accordingly, the coding block may be encoded using at least one among a skip mode, intra prediction, or inter prediction.

Alternatively, a plurality of coding blocks generated by partitioning a coding block may be configured to share at least one of motion information, merge candidates, reference samples, reference sample lines, or intra prediction modes. As an example, when a coding block is partitioned by triple tree-based partitioning, partitions generated by partitioning the coding block may share at least one of motion information, merge candidates, reference samples, reference sample lines, or intra prediction modes according to a size or shape of the coding block. Alternatively, only some of a plurality of coding blocks may be set to share the information, and the other coding blocks may be set not to share the information.

As another example, by partitioning the coding block, a prediction block or a transform block that is in a size smaller than that of the coding block may be used.

Hereinafter, a method of performing a transform on a coding block or a transform block generated by partitioning a coding block will be described in detail. In an embodiment to be described later, a current block may represent a transform block or a coding block as a basic unit in which transformation and quantization are performed.

Figure 9:
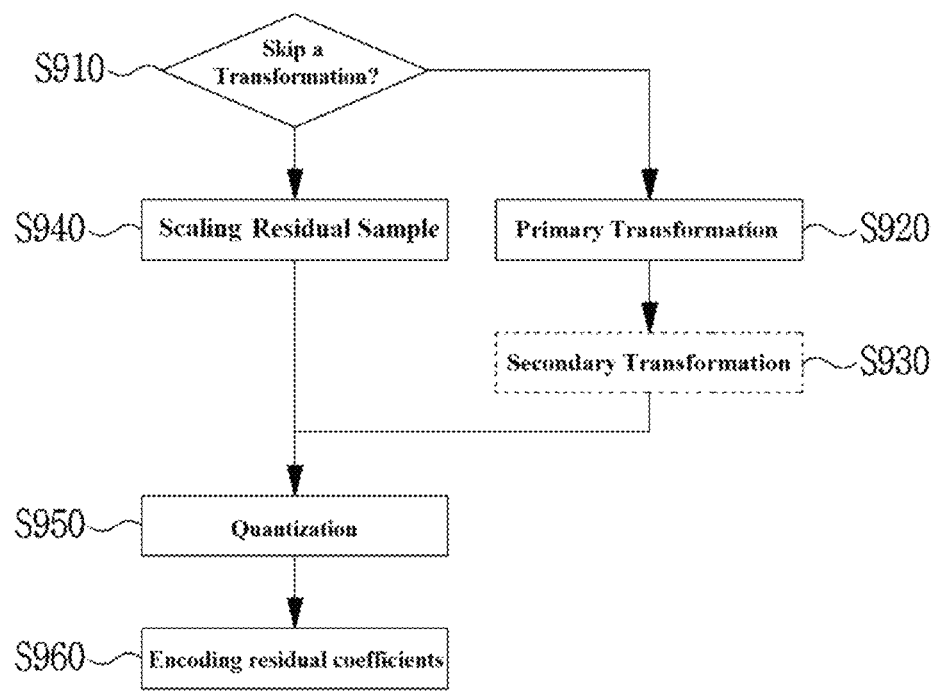
FIG. 9 is a flowchart illustrating an encoding process of residual samples as an embodiment to which the present invention is applied.

FIG. 9 is a flowchart illustrating an encoding process of residual samples as an embodiment to which the present invention is applied.

A residual sample may be obtained by subtracting a prediction sample from an original sample.

When a residual sample is obtained, it may be determined whether to skip a transformation for the obtained residual sample (S910). The encoder may encode information indicating whether a transformation for a current block is skipped. As an example, 'transform_skip_flag' indicates whether the transformation for the current block is skipped. A value of transform_skip_flag of 1 indicates that the transformation for the current block is skipped, and a value of transform_skip_flag of 0 indicates that the transformation for the current block is not skipped.

The encoder may encode information for determining a size of a block allowed to skip a transformation. For example, 'log 2_transform_skip_max_size_minus2' represents a maximum size of a block allowed to skip a transformation. The encoder may encode the transform_skip_flag only when a current block is smaller than or equal to a maximum size allowed to skip a transformation.

Alternatively, it may be determined whether to skip a transformation for each of a horizontal direction and a vertical direction. The encoder may encode at least one of information on whether to skip a transformation for a horizontal direction or information indicating whether to skip a transformation for a vertical direction. For example, at least one of 'hor_transform_skip_flag' indicating whether to skip a transformation for a horizontal direction or 'ver_transform_skip_flag' indicating whether to skip a transformation for a vertical direction may be encoded.

When it is determined that transform skip is not applied to the current block, a primary transformation may be performed on the current block (S920). The primary transformation may be performed based on a transformation core such as DCT or DST. The transformation core may be determined based on a transform type of a current block. The encoder may encode information for determining the transform type of the current block. Alternatively, the transform type of the current block may be implicitly derived according to a predetermined rule in the encoder and the decoder. For example, based on at least one of a size of a current block, a shape of the current block, an encoding mode of the current block, or an intra prediction mode of the current block, the transform type of the current block may be determined.

A secondary transformation may be performed on primary transformed transform coefficients (S930). Only when a primary transformation is performed on a current block, the secondary transformation may be selectively performed. Whether to perform the secondary transformation may be determined based on at least one of a size, shape, transform type, encoding mode, or intra prediction mode of the current block. Alternatively, the encoder may encode information indicating whether to perform the secondary transformation.

A secondary transformation may be performed on a partial region of a current block. A location and/or size of a region where the secondary transformation is performed may be predefined in the encoder and the decoder. Alternatively, information indicating a performing region of the secondary transformation may be encoded in a bitstream. Alternatively, based on at least one of a size, shape, encoding mode, or intra prediction mode of the current block, the performing region of the secondary transformation may be determined.

When it is determined that a transformation for a current block is skipped, a residual sample of the current block may be scaled (S940). The scaling may be performed using a scaling parameter. The scaling parameter may be determined based on a width, height, or size of the current block.

Transform coefficients generated by transforming a residual coefficient or a scaled residual coefficient generated by scaling the residual coefficient may be quantized (S950). The residual coefficients generated as a result of quantization may be arranged in one dimension, and the residual coefficients may be encoded (S960). An arrangement order of the residual coefficients may follow at least one of a diagonal scan, a zigzag scan, an up-right scan, a vertical scan, or a horizontal scan.

Figure 10:
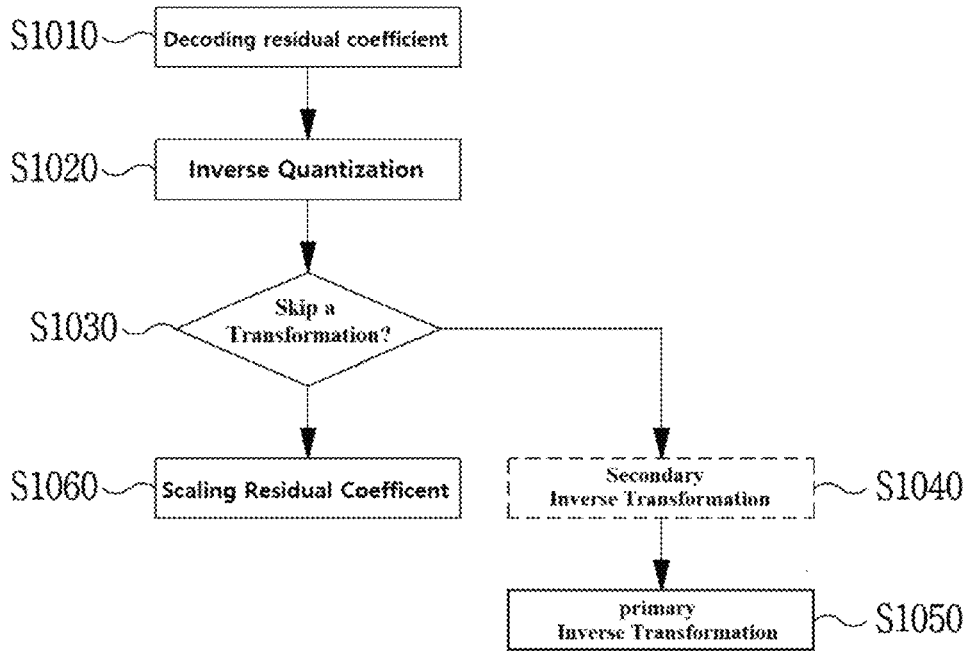
FIG. 10 is a flowchart illustrating a process of decoding a residual sample according to an embodiment to which the present invention is applied.

FIG. 10 is a flowchart illustrating a process of decoding a residual sample according to an embodiment to which the present invention is applied.

First, a residual coefficient of a current block may be obtained (S1010). The decoder may obtain the residual coefficient through coefficient scanning. The coefficient scanning may be performed based on at least one of a diagonal scan, a zigzag scan, an up-right scan, a vertical scan, or a horizontal scan. A scan order of the current block may be determined based on at least one of a size, a shape, an encoding mode, or an intra prediction mode of the current block. As a result of the coefficient scanning, a residual coefficient in a form of a two-dimensional block may be obtained.

Inverse quantization may be performed on a residual coefficient of a current block (S1020).

It may be determined whether to skip an inverse transformation in an inverse quantized residual coefficient of a current block (S1030). Information indicating whether an inverse transformation for a current block is skipped may be signaled through a bitstream. For example, 'transform_skip_flag' indicates whether the inverse transformation for the current block is skipped. A value of transform_skip_flag of 1 indicates that the inverse transformation for the current block is skipped, and a value of transform_skip_flag of 0 indicates that the inverse transformation of the current block is not skipped.

Information for determining a size of a block allowed to skip an inverse transformation may be signaled through a bitstream. As an example, 'log 2_transform_skip_max_size_minus2' represents a maximum size of a block allowed to skip an inverse transformation is allowed. The transform_skip_flag may be encoded only when the current block is smaller than or equal to the maximum size allowed to skip the inverse transformation. When encoding of the transform_skip_flag is omitted, a value of transform_skip_flag may be derived as a predefined value. The predefined value may be 0. Accordingly, when a size of the current block is larger than the maximum size allowed to skip the inverse transformation, the inverse transformation may be performed on the current block.

Alternatively, it may be determined whether to skip the inverse transformation for each of a horizontal direction and a vertical direction. At least one of information indicating whether to skip the inverse transformation for the horizontal direction or information indicating whether to skip the inverse transformation for the vertical direction may be signaled through a bitstream. For example, at least one of 'hor_transform_skip_flag' indicating whether to skip the inverse transformation for the horizontal direction or 'ver_transform_skip_flag' indicating whether to skip the inverse transformation for the vertical direction may be signaled through the bitstream.

The hor_transform_skip_flag and the ver_transform_skip_flag may be encoded only when the current block is smaller than a maximum size allowed to skip the inverse transformation. As an example, the hor_transform_skip_flag may be encoded only when a width of the current block is smaller than the maximum size allowed to skip the inverse transformation. In addition, the ver_transform_skip_flag may be encoded only when a height of the current block is smaller than the maximum size allowed to skip the inverse transformation.

Alternatively, it may be determined whether to encode the hor_transform_skip_flag and the ver_transform_skip_flag based on a shape of the current block. As an example, the hor_transform_skip_flag may be encoded only when the current block is a non-square block having a width greater than a height. In addition, the ver_transform_skip_flag may be encoded only when the current block is a non-square block having a height greater than a weight.

When encoding of information is omitted, a value of the information may be derived as a predefined value. The predefined value may be 0.

When it is determined that an inverse transformation is performed on a current block, an inverse quantized residual coefficient of the current block may be inversely transformed (S1040, S1050). The inverse transformation may be performed in an order of a secondary inverse transformation and a primary inverse transformation. The secondary inverse transformation may be performed on a partial region of the current block. A transform matrix for the secondary inverse transformation may be determined based on a size of a region to which the secondary inverse transformation is applied.

A secondary inverse transformation may be selectively performed. In other words, it is possible to perform a primary inverse transformation while omitting the secondary inverse transformation. Whether the secondary inverse transformation is performed may be determined based on at least one of a size, a shape, a transform type, an encoding mode, or an intra prediction mode of the current block. Alternatively, information indicating whether the secondary inverse transformation is performed may be signaled through a bitstream.

The primary inverse transformation may be performed based on a transformation core such as DCT or DST. The encoder may encode information for determining a transform type of a current block. Alternatively, the transform type of the current block may be determined according to a rule predetermined by the encoder and the decoder. For example, based on at least one of a size of a current block, a shape of the current block, an encoding mode of the current block, or an intra prediction mode of the current block, the transform type of the current block may be determined.

As a result of performing the inverse transformation, a residual sample of the current block may be obtained.

When it is determined that an inverse transformation is skipped in the current block, an inverse quantized residual coefficient of the current block may be scaled (S1060). The scaling may be performed using a scaling parameter. The scaling parameter may be determined based on a width, height, or size of the current block. A residual coefficient of the current block may be obtained by scaling the inverse quantized residual coefficient based on the scaling parameter.

Transformation in at least one of a vertical direction or a horizontal direction may be skipped. When transform skip is applied only in the horizontal direction, the transform may not be performed in the horizontal direction, but may be performed in the vertical direction. When the transform skip is applied only in the vertical direction, the transform may not be performed in the vertical direction, but may be performed in the horizontal direction.

It may be determined whether or not a transform skip technique for the current block can be used according to the partitioning type of a parent node block. For example, when a current block is generated through binary tree-based partitioning, the transform skip technique may not be allowed for the current block. That is, when the current block is generated through binary tree-based partitioning, a residual sample of the current block may be obtained by transforming an inverse quantized residual coefficient. When the current block is generated through binary tree-based partitioning, encoding/decoding of information indicating whether transformation is skipped (e.g., at least one of transform_skip_flag, hor_transform_skip_flag, or ver_transform_skip_flag) may be omitted.

Alternatively, when a current block is generated through binary tree-based partitioning, a transform skip technique may be allowed only in a horizontal direction or a vertical direction. A direction in which the transform skip technique is not allowed may be determined based on at least one of information signaled through a bitstream, a size of the current block, a shape of the current block, or an intra prediction mode of the current block. As an example, when the current block has a non-square shape whose width is greater than the height, the transform skip technique may be allowed only in a vertical direction. That is, when the current block is in a form of 2N×N, transformation may be performed in a horizontal direction and may be selectively performed in a vertical direction. Alternatively, when the current block is a non-square shape whose height is greater than the width, the transform skip technique may be allowed only in a horizontal direction. That is, when the current block is in a form of N×2N, transformation may be performed in a vertical direction and may be selectively performed in a horizontal direction. Contrary to the above example, when the current block is a non-square block whose width is greater than the height, the transform skip technique is allowed only in the horizontal direction, and when the current block is a non-square block whose height is greater than the width, the transform skip technique is allowed only in the vertical direction.

Alternatively, whether to skip transformation of the current block may be determined according to a partitioning type of a parent node block. As an example, when the current block is generated by binary tree-based partitioning, transformation in a horizontal direction or a vertical direction may be omitted. That is, if the current block is generated by binary tree-based partitioning, transformation in at least one of a horizontal direction or a vertical direction of the current block may be skipped without encoding/decoding information indicating whether the transformation of the current block is skipped (e.g., transform_skip_flag, hor_transform_skip_flag, ver_transform_skip_flag).

Hereinafter, a primary transformation/inverse transformation and a secondary transformation/inverse transformation will be described in detail. Hereinafter, matters described focusing on the primary transformation and the secondary transformation may be extendedly applied to the primary inverse transformation and the secondary inverse transformation.

A primary transformation may be performed based on a transformation core such as DCT or DST. As an example, Equation 1 represents a transformation matrix $A_4$ based on DST-VII. An inverse transformation based on DST-VII may be performed based on $A_4^T$.

$$A_4 = \begin{bmatrix} 29 & 55 & 74 & 84 \\ 74 & 74 & 0 & -74 \\ 84 & -29 & -74 & 55 \\ 55 & -84 & 74 & -29 \end{bmatrix} \quad \text{[Equation 1]}$$

Equation 2 represents a transform matrix $T_8$ based on DCT-II. Inverse transformation based on DCT-II may be performed based on $T_8^T$.

$$T_8 = \begin{bmatrix} 64 & 64 & 64 & 64 & 64 & 64 & 64 & 64 \\ 89 & 75 & 50 & 18 & -18 & -50 & -75 & -89 \\ 83 & 36 & -36 & -83 & -83 & -36 & 36 & 83 \\ 75 & -18 & -89 & -50 & 50 & 89 & 18 & -75 \\ 64 & -64 & -64 & 64 & 64 & -64 & -64 & 64 \\ 50 & -89 & 18 & 75 & -75 & -18 & 89 & -50 \\ 36 & -83 & 83 & -36 & -36 & 83 & -83 & 36 \\ 18 & -50 & 75 & -89 & 89 & -75 & 50 & -18 \end{bmatrix} \quad \text{[Equation 2]}$$

A transformation core of a current block may be determined based on a transform type of the current block. The transform type of the current block may be explicitly determined based on information signaled through a bitstream. The information may be index information indicating a transform type for a horizontal direction and a transform type for a vertical direction. Table 1 shows an example in which a transform type of a horizontal direction and a transform type of a vertical direction are determined based on the index information.

TABLE 1

| Transform set Index | HorTrType | VerTrType |
| --- | --- | --- |
| 0 | DST-VII | DST-VII |
| 1 | DCT-II | DCT-II |
| 2 | DCT-VII | DCT-II |
| 3 | DCT-II | DCT-VII |
| 4 | DCT-VII | DCT-VII |

In table 1, HorTrType represents a transform type of a horizontal direction, and VerTrType represents a transform type of a vertical direction.

Information indicating whether index information for determining a transform type for a horizontal direction and a vertical direction is signaled may be encoded. The information may be signaled through a picture parameter set or a sequence parameter set. When the index information is not signaled, a transform type for a horizontal direction and a vertical direction may be implicitly determined based on at least one of a size, a shape, or an intra prediction mode of a current block.

For example, when a current block is encoded by inter prediction, a transform type of a horizontal direction and a vertical direction may be determined based on a size or shape of the current block. Specifically, when the current block is a non-square shape whose width is greater than the height and the width of the current block is included in a predefined range, the transform type of the horizontal direction of the current block may be determined as DCT-II. If the above condition is not satisfied, the transform type of the horizontal direction of the current block may be determined as DST-VII. In addition, when the current block is a non-square shape whose height is greater than the width and the height of the current block is included in a predefined range, the transform type of the vertical direction of the current block may be determined as DCT-II. If the above condition is not satisfied, the transform type of the vertical direction of the current block may be determined as DST-VII. The predefined range may be defined as N or more and/or M or less. N and M are different natural numbers and may be 4, 8, 16 or 32.

When a current block is encoded by intra prediction, a transform type of a horizontal direction and a transform type of a vertical direction may be determined based on at least one of a size, shape, or intra prediction mode of the current block. For example, when an intra prediction mode of a current block is a DC mode, a transform type of a horizontal direction and a transform type of a vertical direction of the current block may be determined as DST-VII.

When an intra prediction mode of a current block is a Planar mode, a transform type of a horizontal direction and a transform type of a vertical direction of the current block may be determined based on whether a width and height of the current block are included in a predefined range, respectively. For example, when the width of the current block is included in the predefined range, the transform type of the horizontal direction of the current block may be determined as DCT-II. On the other hand, when the width of the current block is not included in the predefined range, the transform type of the horizontal direction of the current block may be determined as DST-VII. When the height of the current block is included in the predefined range, the transform type of the vertical direction of the current block may be determined as DCT-II. On the other hand, when the height of the current block is not included in the predefined range, the transform type of the vertical direction of the current block may be determined as DST-VII.

When an intra prediction mode of a current block is a directional mode of the first direction, a transform type of a horizontal direction of the current block may be determined as DST-VII. When the intra prediction mode of the current block is the first directional mode, a transform type of a vertical direction of the current block may be determined as DST-VII or DCT-II depending on whether a height of the current block is included in a predefined range When an intra prediction mode of a current block is a directional mode of the second direction, a transform type of a horizontal direction of the current block may be determined as DST-VII or DCT-II depending on whether a width of the current block is included in a predefined range. When the intra prediction mode of the current block is the second directional mode, a transform type of a vertical direction of the current block may be determined as DST-VII. The first direction and the second direction may be different from each other.

Alternatively, the transform type of the current block may be determined based on at least one of a size, shape, encoding mode, or intra prediction mode of the current block, but the transform type of the vertical direction and the transform type of the horizontal direction may be set to be the same.

As an example, when a current block is a 4×4 block coded in an intra mode, a DST (specifically, DST-VII) based transform matrix may be used. If the current block does not satisfy the above condition, a DCT (specifically, DCT-II) based transform matrix may be used.

Alternatively, a transform type of a current block may be determined based on at least one of an intra prediction mode of the current block or the number of samples included in the current block. The number of samples for determining the transform type may have a value predefined by the encoder and the decoder. Alternatively, information for determining the number of samples may be signaled through a bitstream. The information may be signaled through a block, a slice header, or a picture parameter set.

When the number of samples represents 16, if the current block is encoded by the intra prediction mode and the number of samples included in the current block is 16 or less, a DST-based transform matrix may be applied to the current block. For example, a DST-based transform matrix may be applied to a block having a size of 4×4, 2×8, or 8×2 encoded by intra prediction. On the other hand, when the current block does not satisfy the above condition, a DCT-based transform matrix may be used.

The condition for determining a transform type may be set differently for each sequence, slice, or block. As an example, in slice 0, when a transform block encoded in an intra mode has a size of 4×4, DST may be selected. On the other hand, in slice 1, when a transform block encoded in the intra mode has a size of 8×8 or less than 8×8, DST may be selected.

As another example, based on a transform set, a transform type of a current block may be determined. Index information specifying the transform type of the current block may be signaled through a bitstream. Alternatively, the transform type of the current block may be determined based on at least one of a size, shape, coding mode, or intra prediction mode of the current block. The transform set may be determined for a coding block or a transform block. Accordingly, transform sets between the coding blocks and the transform blocks may be different from each other. Alternatively, a plurality of transform blocks may share one transform set. The plurality of transform blocks may be included in a coding block having a predetermined size or a predetermined shape.

Table 2 illustrates a plurality of transform sets.

TABLE 2

| Transform set Index | Transform candidate 0 | Transform candidate 1 |
| --- | --- | --- |
| 0 | DST-VII | DCT-II |
| 1 | DST-VII | DST-I |
| 2 | DST-VII | DCT-VIII |

The transform set may include at least one transform type candidate. At least one of the number of transform type candidates or a type of the transform type candidates included in each of a plurality of transform sets may be different. That is, at least one of the number of the transform type candidates or the type of the transform type candidates included in one transform set may be different from that of another transform set.

Table 1 illustrates that each transform set includes two transform type candidates. A transform set including one, three, four, or more transform type candidates may be defined. Alternatively, transform type candidate 0 and transform type candidate 1 may define the same transform set.

Alternatively, a maximum number of transform type candidates included in a transform set may be signaled through a bitstream. The number of transform type candidates included in each transform set may be less than or equal to the maximum number signaled through the bitstream. The information may be signaled through a slice header or a sequence header.

Any one of transform type candidates included in a transform set may be determined as a transform type of a current block. The transform type of the current block may be determined based on at least one of a size, shape, encoding mode, or intra prediction mode of the current block. The intra prediction mode represents an intra prediction mode of a prediction block or a coding block corresponding to a transform block.

As an example, when a current block is a block having a size of 4×4 encoded in an intra mode, a transform type candidate 0 in a transform set may be determined as a transform type of the current block. On the other hand, when the current block does not satisfy the above condition, a transform type candidate 1 in the transform set may be determined as the transform type of the current block.

As a specific example, when a transform set index 0 is determined as a transform set of a current block, if the current block is a 4×4 size block encoded in an intra mode, a transformation may be performed based on DST-VII. On the other hand, when the current block does not satisfy the above condition, the transformation may be performed based on DCT-II. When a transform set index 2 is determined as the transform set of the current block, if the current block is a 4×4 or 8×8 size block encoded in an intra mode, the transformation may be performed based on DST-VII. If the current block does not satisfy the above condition, the transformation may be performed based on DCT-VIII.

A selection condition for transform type candidates may be determined based on at least one of a size, shape, coding mode, or intra prediction mode of the coding block. For example, when the size of the coding block is less than or equal to 32×32, the transform type candidate 0 may be applied only when the transform block is encoded in an intra mode and the size of the transform block is 4×4. On the other hand, when the size of the coding block is larger than 32×32, the transform type candidate 0 may be applied only when the transform block is encoded in the intra mode and the size of the transform block is 8×8 or less.

Alternatively, information for specifying any one of a plurality of transform type candidates may be signaled through a bitstream.

Transform skip may be set as a transform type candidate. Whether transform skip can be used as a transform type candidate may be determined based on whether transform skip is allowed in the current block. Depending on whether transform skip can be used as a transform skip candidate, at least one of the type of transform type candidates included or the number of transform type candidates in the transform set may be differently set.

Table 3 shows a plurality of transform sets in which transform skip is set as a transform skip candidate.

TABLE 3

| Transform set Index | Transform candidate 0 | Transform candidate 1 | Transform candidate 2 |
|---|---|---|---|
| 0 | DST-VII | DCT-II | Transform skip |
| 1 | DST-VII | DST-I | Transform skip |
| 2 | DST-VII | DCT-VIII | Transform skip |

When transform_skip_enabled_flag indicating whether to allow transform skip within a predetermined picture is 1, as shown in Table 3, a transform set further including transform skip as a transform type candidate may be used. On the other hand, when transform_skip_enabled_flag is 0, as shown in Table 2, a transform set that does not include transform skip as a transform type candidate may be used.

A transform type for a horizontal direction and a transform type for a vertical direction of the current block may be set equally. For example, when the transform type of the current block is determined, the determined transform type may be applied to both the determined horizontal transformation and the determined vertical transformation. Alternatively, a transformation type for a horizontal direction and a transformation type for a vertical direction of the current block may be set differently. For example, when a transform set of the current block is determined, a transform type candidate 0 may be determined as the transform type for the horizontal direction, and a transform type candidate 1 may be determined as the transform type for the vertical direction.

As another example, a transform set for a horizontal direction and a transform set for a vertical direction may be individually determined. For this, a first transform set index for specifying the transform set in the horizontal direction and a second transform set index for specifying the transform set in the vertical direction may be signaled through a bitstream. Any one of the transform type candidates included in the first transform set specified by the first transform set index may be determined as the transform type in the horizontal direction. Any one of the transform type candidates included in the second transform set specified by the second transform set index may be determined as the transform type in the vertical direction.

As an example, it is assumed that a transform set corresponding to a transform set index 0 is determined as a transform set of a horizontal direction, and a transform set corresponding to a transform set index 1 is determined as a transform set for the vertical direction. When a current block is not encoded by intra prediction or a size of the current block is not 4×4, a transform type candidate 1 may be determined as a transform type of the current block. That is, as for a transform type of a vertical transformation, a transform type candidate 1 (i.e., DCT-II) included in a transform set index 0 is determined as the transformation type of the horizontal direction, and a transform type candidate 1 included in a transform set index 1 (i.e., DST-I) may be determined as the transform type of the vertical direction.

The first transform set index and the second transform set index may represent the same transform set. Alternatively, the second transform set index may specify one of the residual transform sets excluding the transform set specified by the first transform set index.

Whether a transform set for a horizontal direction and a transform set for a vertical direction are the same may be determined based on at least one of a size, shape, encoding mode, or intra prediction mode of a current block. For convenience of explanation, a transform set for a horizontal transform is defined as a horizontal direction transform set, and a transform set for a vertical transform is defined as a vertical direction transform set. For example, when an intra prediction mode of a current block is an intra prediction mode similar to a horizontal direction or an intra prediction mode similar to a vertical direction, the horizontal direction transform set and the vertical direction transform set may be different from each other. Herein, the intra prediction mode similar to the horizontal direction may mean an intra prediction mode in which the difference in a mode value from a horizontal direction or a horizontal direction intra prediction mode is within a predefined value. In addition, the intra prediction mode similar to the vertical direction may mean an intra prediction mode in which the difference in a mode value from a vertical direction or a vertical direction intra prediction mode is within a predefined value.

On the other hand, when an intra prediction mode of a current block is a non-directional mode or a directional mode that does not satisfy the above condition, a horizontal direction transform set and a vertical direction transform set may be the same. When the horizontal direction transform set and the vertical direction transform set are set to be the same, at least one of the first index information for specifying the horizontal direction transform set or the second index information for specifying the vertical direction transform set may be omitted.

Alternatively, when an intra prediction mode of a current block is a non-directional mode, it is possible to set a horizontal direction transform set and a vertical direction transform set of the current block differently from each other.

Figure 11:
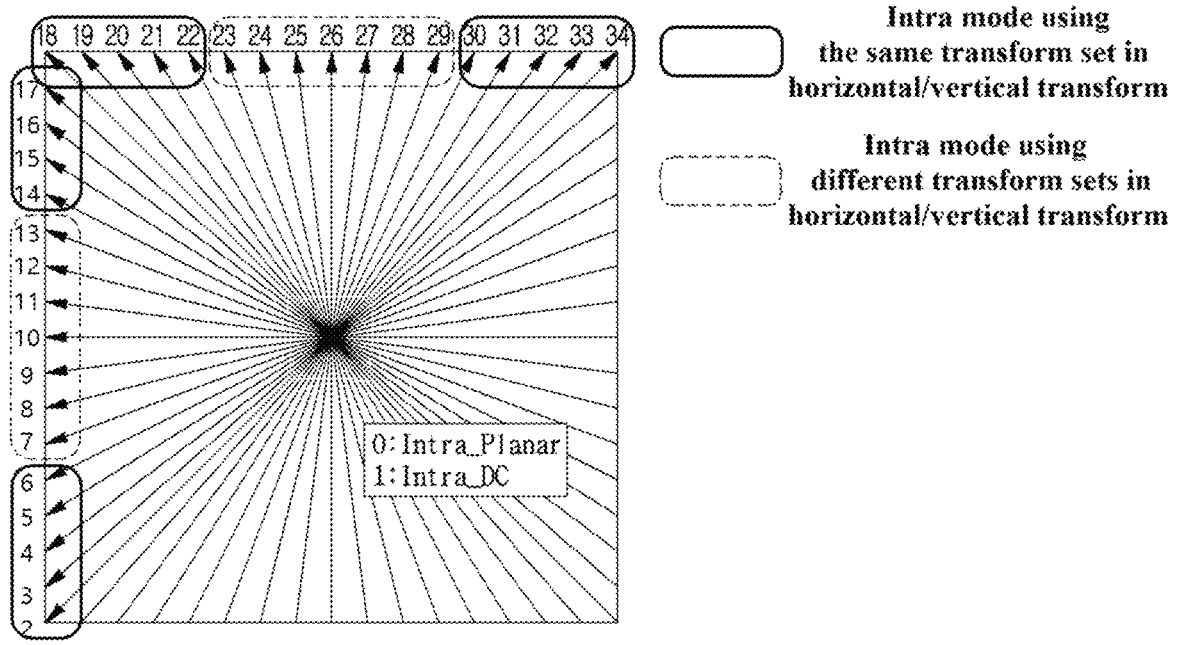
FIG. 11 is a diagram illustrating whether a transform set in a vertical direction and a transform set in a horizontal direction are the same for 33 intra prediction modes.

FIG. 11 is a diagram illustrating whether a transform set in a vertical direction and a transform set in a horizontal direction are the same for 33 intra prediction modes.

In the example shown in FIG. 11, when an intra prediction mode of a current block is included in a range of 7-13 or 23-29, a horizontal direction transform set and a vertical direction transform set are shown to be different from each other. On the other hand, when the intra prediction mode of the current block is a directional mode not included in the range, it is shown that the horizontal direction transform set and the vertical direction transform set are the same.

When a block having the same intra prediction mode as a current block in a predetermined block exists, a transform set of the current block may be set equal to a transform set of a block having the same intra prediction mode as the current block. Herein, the predetermined block may be a coding block, a coding tree block, or a block having a predetermined size.

As an example, it is assumed that a direction of an intra prediction mode corresponding to the first transform block in a coding block is vertical (e.g., mode number 26), a horizontal direction transform set is index 2, and a vertical direction transform set is index 0. Herein, an order of transform blocks may be determined according to a scan order of the coding block.

When a transform block having an intra prediction mode of a vertical direction in a coding block further exists, a transform set index value may not be signaled to a newly scanned transform block. Instead, a transform set of a transform block having an intra prediction mode of a vertical direction may be applied to a transform set of the newly scanned transform block. That is, a horizontal direction transform set and a vertical direction transform set of the newly scanned transform block may be determined as index 2 and index 0, respectively.

As another example, when a block having an intra prediction mode similar to a current block in a predetermined block exists, a transform set of the current block may be set equal to a transform set of the block having the intra prediction mode similar to the current block. Herein, the intra prediction mode similar to the current block may refer to a standard intra prediction mode or an intra prediction mode in which a difference in a mode value from the standard intra prediction mode is less than or equal to a predefined value. The standard intra prediction mode may include an intra prediction mode of a horizontal direction or an intra prediction mode of a vertical direction.

As an example, it is assumed that a direction of an intra prediction mode corresponding to a first transform block in a coding block is vertical (e.g., mode number 26), a horizontal direction transform set is index 2, and a vertical direction transform set is index 0.

When a transform block having an intra prediction mode (e.g., mode number 27) similar to the vertical direction in a coding block exists, a transform set index value may not be signaled to a newly scanned transform block. Instead, a transform set of a transform block having an intra prediction mode similar to an intra prediction mode of the current block may be applied to the transform set of the newly scanned transform block. That is, the horizontal direction transform set of the newly scanned transform block may be determined as index 2, and the vertical direction transform set may be determined as index 0.

Based on an intra prediction mode of a current block, a transform set for a horizontal direction and/or a transform set for a vertical direction may be determined. Table 4 shows a horizontal direction transform set and a vertical direction transform set according to the intra prediction mode of the current block.

TABLE 4

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| H | 2 | 1 | 0 | 1 | 0 | 1 | 0 | 1 | 0 | 0 | 0 | 0 | 0 | 1 | 0 | 1 | 0 | 1 |
| V | 1 | 1 | 0 | 1 | 0 | 1 | 0 | 1 | 2 | 2 | 2 | 2 | 2 | 1 | 0 | 1 | 0 | 1 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| H | 0 | 1 | 0 | 1 | 0 | 1 | 2 | 2 | 2 | 2 | 2 | 1 | 0 | 1 | 0 | 1 | 0 |
| V | 0 | 1 | 0 | 1 | 0 | 1 | 0 | 0 | 0 | 0 | 0 | 1 | 0 | 1 | 0 | 1 | 0 |

When the current block is encoded by inter prediction, the current block may use a predefined transform set. The predefined transform set may be a transform set having index 0.

Alternatively, when a coding block is encoded by inter prediction, a transform set is selected for the coding block, and transform blocks within the coding block may use transform type candidates included in the transform set of the coding block. In this case, the transform type of each transform block may be determined by a size and/or shape of the transform block, or information for identifying a transform type selected by each transform block may be signaled through a bitstream.

Selecting a transform type of a current block from among a plurality of transform type candidates may be defined as an adaptive multiple transform (AMT). Whether the adaptive multiple transform is applied to the current block may be determined based on at least one of a size, a shape, an encoding mode, or an intra prediction mode of the current block. Information for determining at least one of a size or a shape of a block in which adaptive multiple transform is allowed may be signaled through a bitstream. The size information may include at least one of a maximum size or a minimum size in which multiple transform is allowed. A size of a block in which multiple transform is allowed and/or information for determining the size of the block may be signaled through at least one of a block, a slice header, or a sequence header.

Next, a secondary transformation will be described.

After performing a primary transformation on a current block, the encoder may perform a secondary transformation. After performing a secondary inverse transform on the current block, the decoder may perform a primary inverse transform.

Whether a secondary transformation is applied to a current block may be determined based on at least one of a size, a shape, a transform type, or a quantization parameter size of the current block. For example, when at least one of a width or height of the current block is smaller than a predefined value, the secondary transformation may not be performed on the current block.

Figure 12:
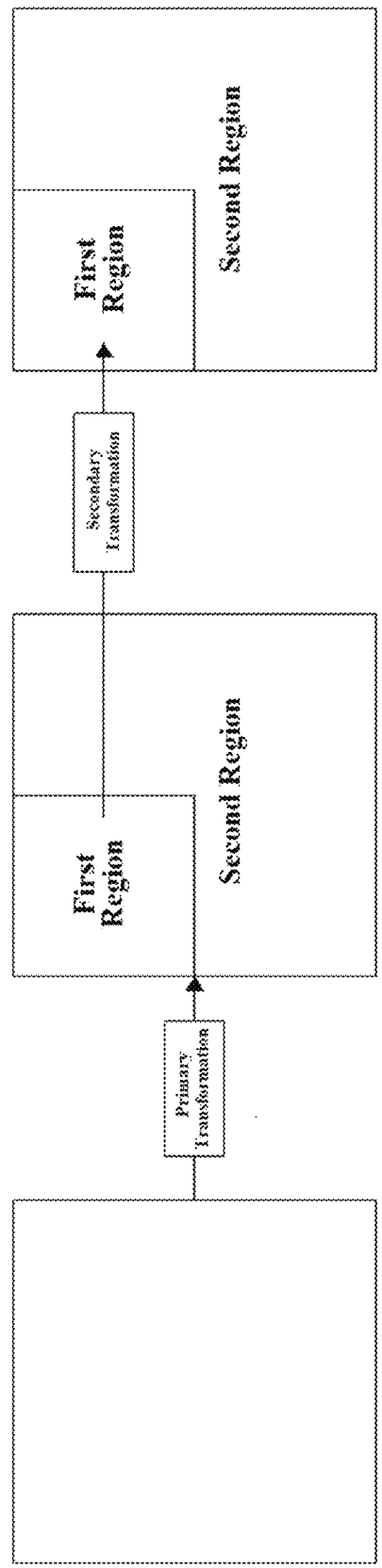
FIG. 12 is a diagram illustrating a performing region of a secondary transformation.

A secondary transformation may be performed on an entire region of a current block or a partial region of the current block. FIG. 12 is a diagram illustrating a performing region of a secondary transformation.

While a primary transformation is performed on an entire region of a current block, a secondary transformation may be performed on a partial region of the current block.

The location and/or size of a region in which a secondary transformation is performed may be predefined in an encoder and a decoder. For example, the region may have a size of M×N, and a location of an upper left corner of the region may coincide with an upper left corner of the current block. M and N may be 2, 4, 8 or 16. M and N may have the same value or different values. For example, a secondary transformation may be applied to a 4×4 block.

Alternatively, a location and/or size of a region where a secondary transformation is performed may be determined based on at least one of a size, shape, transform type, size of a quantization parameter, or whether residual flipping is performed of the current block. For example, when at least one of a height or width of the current block is equal to or smaller than a threshold value, the secondary transformation may be performed on a 4×4 block. When the height and width of the current block are greater than the threshold value, the secondary transformation may be performed on an 8×8 block. Herein, the threshold value may be a natural number such as 4, 8, or 16.

Alternatively, information for determining a location and/or size of a region in which a secondary transformation is performed may be signaled through a bitstream. The information may be signaled through a slice, picture, or sequence.

A secondary transformation may be a separable transformation (separable transform) or a non-separable transformation (non-separable transform). The separable transformation and the non-separable transformation may be classified according to whether a transformation for a horizontal direction and a transformation for a vertical direction are performed separately when performing a secondary transformation.

Specifically, the separable transformation means that a transformation for a horizontal direction and a transformation for a vertical direction are separately performed for a block having a size of M×N. The non-separable transformation means that the transformation for the horizontal direction and the transformation for the vertical direction are not separated for the block having the size of M×N.

A non-separable transformation may be performed based on a one-dimensional matrix in which a transform matrix T and transform coefficients included in a block having a size of M×N are arranged in one dimension. Specifically, a (M×N)×1 matrix may be created by arranging transform coefficients included in a block of M×N size in one dimension, and transform coefficients of size K×1 may be generated by multiplying a transform matrix T of size K×(M×N) by the one-dimensional matrix. The decoder may perform a secondary inverse transform using a transform matrix TT.

A transform matrix T may be determined based on a type of a secondary transformation. Information for determining the type of the secondary transformation may be signaled through a bitstream. Alternatively, the type of the secondary transformation may be determined based on at least one of a size, a width, an encoding mode, or an intra prediction mode of a current block.

Equation 3 shows transform coefficients included in a 4×4 block, and Equation 4 shows an example in which transform coefficients included in a 4×4 block are arranged in one dimension.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{[Equation 3]}$$

$$\tilde{X} = [X_{00}, X_{01}, X_{02}, X_{03}, X_{10}, X_{11}, X_{12}, \quad \text{[Equation 4]}$$
$$X_{13}, X_{20}, X_{21}, X_{22}, X_{23}, X_{30}, X_{31}, X_{32}, X_{33}]$$

A matrix $\tilde{X}$ having a size of 16×1 may be obtained by arranging transform coefficients included in a block having a size of 4×4 in a line. An order of arrangement of transform coefficients may follow a scan order of a current block. That is, the order of arrangement of the transform coefficients may follow at least one of a vertical scan, a horizontal scan, a raster scan, a zigzag scan, or a diagonal scan.

Equation 5 shows an example in which a secondary transformation is performed based on a one-dimensional matrix $\tilde{X}$ and a transform matrix T.

$$\tilde{F} = T \cdot \tilde{X} \quad \text{[Equation 5]}$$

When a size of the transform matrix T is 16×16, a matrix P having a size of 16×1 may be generated as a result of the secondary transformation.

Performing non-separable transformation on only some regions of the transform block may be referred to as sub-non-separable transform. Equation 6 shows the sub-non-separable transform.

$$F'_i = T' \cdot X'_i \quad \text{[Equation 6]}$$

T' represents a transform matrix, and $X'_i$ represents a matrix in which transform coefficients included in a sub-block are arranged in one dimension. $F'_i$ represents non-separable transform coefficients generated as a result of performing a non-separable transformation. The non-separable transform coefficients of a region where non-separable transformation is not performed may be set to a predefined value. The predefined value may be an integer including 0.

A size of each matrix may be determined based on a size of a subblock on which non-separable transformation is performed. As an example, it is assumed that non-separable transformation is performed only in a region corresponding to a 2×2 size subblock of a 4×4 size transform block. $X_i'$ represents a 4×1 matrix in which transform coefficients included in the 2×2 subblock are arranged in one dimension, and T' represents a 16×4 transform matrix. $F_i'$ represents a 16×1 transform coefficient matrix generated as a result of performing the non-separable transformation.

For example, it is assumed that a non-separable transformation is performed only in a region corresponding to an 8×4 size subblock of an 8×8 size transform block. $X_i'$ represents a 32×1 matrix in which transform coefficients included in an 8×4 subblock are arranged in one dimension, and T' represents a 64×32 transform matrix. $F_i'$ represents a transform coefficient matrix having a size of 64×1 generated as a result of performing the non-separable transformation.

As an example, it is assumed that non-separable transformation is performed only in a region corresponding to a 4×4 size subblock of an 8×8 size transform block. $X_i'$ represents a 16×1 matrix in which transform coefficients included in a 4×4 subblock are arranged in one dimension, and T' represents a 64×16 transform matrix. $F_i'$ represents a transform coefficient matrix having a size of 64×1 generated as a result of performing the non-separable transformation.

A region in which a secondary transformation is performed does not necessarily have to be square. For example, a non-square region having a size of 2×8 or 8×2 or a polygonal region in which three blocks having a size of 4×4 are combined may be determined as a performing region of a secondary transformation.

A size or region of a region in which a secondary transformation is performed may be determined according to a size, shape, encoding mode, or intra prediction mode of a current block. For example, when the current block is a square, the region in which the secondary transformation is performed may be set to a square. When the current block is a non-square, the region in which the secondary transformation is performed may be set to a non-square.

A non-separable transformation may be composed of a plurality of sub non-separable transformations. Equation 7 shows a plurality of non-separable transformations.

$$F_0' = T' \cdot X_0', F_1' = T' \cdot X_1', F_2' = T' \cdot X_2', \ldots, F_{n-1}' = T' \cdot X_{n-1}' \quad \text{[Equation 7]}$$

In Equation 7, $X_n'$ represents a matrix in which transform coefficients included in the N-th subblock are arranged in one dimension. A non-separable transform coefficient $F_n'$ for the N-th sub-block may be generated through sub non-separable transformation.

A set of non-separable transform coefficients of each sub-block may be set as non-separable transform coefficients of a current block. Equation 8 shows a non-separable transform coefficient F of the current block.

$$F = \begin{bmatrix} F_0 & \ldots & F_{i-1} \\ F_i & \ldots & F_{n-1} \end{bmatrix} \quad \text{[Equation 8]}$$

A size of a transform matrix T may be determined based on a size of a region to which a secondary transformation is applied. For example, when the secondary transformation is applied to a 4×4 block, a 16×16 transform matrix may be used, and when the secondary transformation is applied to an 8×8 block, a 64×64 transform matrix may be used.

Alternatively, a reduced transform matrix in which the number of rows or columns is smaller than the number of samples included in a region to which a secondary transformation is applied may be used. For example, for a 4×4 block, the secondary transformation may be performed using a 4×16 reduced transform matrix instead of a 16×16 transform matrix. When the reduced transform matrix is used, four transform coefficients may be output as a result of performing the secondary transformation. The four samples may be mapped to a block having a size of 2×2 at an upper left of the block, and transform coefficients of the residual region may be set to 0.

Alternatively, for an 8×8 block, a secondary transformation may be performed using a 16×64 reduced transform matrix instead of a 64×64 transform matrix. When the reduced transform matrix is used, 16 transform coefficients may be output as a result of performing the secondary transformation. The 16 samples may be mapped to a block having a size of 4×4 at an upper left of the block, and transform coefficients of the residual region may be set to 0.

Information for determining a size of a reduced transform matrix may be signaled through a bitstream. The information may indicate a reducing parameter. The number of columns or rows of the reduced transform matrix may be determined by scaling the number of samples included in a performing region of a secondary transformation using the reducing parameter.

Whether a reduced transform matrix is applied may be determined based on at least one of a size, shape, coding mode, intra prediction mode, or transform mode of a current block. For example, when at least one condition of the case where a width and/or height of the current block is greater than or equal to a threshold value or the case where the current block is encoded by intra prediction is satisfied, a secondary transformation based on a reduced transform matrix may be allowed.

Alternatively, information indicating whether the reduced transform matrix is allowed may be signaled through a bitstream.

In the above-described embodiment, it has been described that residual coefficients are encoded in an order of a primary transformation, a secondary transformation, and quantization. Unlike the described example, the residual coefficients may be encoded in an order of a primary transformation, quantization, and a secondary transformation.

The application of the embodiments described focusing on the decode process or encoding process to the encoding process or decoding process is included in the scope of the present invention. The change of the embodiments described in a predetermined order into a different order is also included in the scope of the present invention.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method of decoding an image, the method comprising:
   obtaining residual coefficients of a current block;
   performing inverse-quantization for the residual coefficients;
   performing a secondary inverse-transform for the current block;
   performing a primary inverse-transform on a result of performing the secondary inverse-transform; and
   obtaining reconstruction samples of the current block based on residual samples resulting from the primary inverse-transform,
   wherein the secondary inverse-transform is performed for inverse-quantized residual coefficients, resultant from the inverse-quantization, included in a partial region of the current block,
   wherein the secondary inverse-transform is performed by using an inverse-transform matrix and an input matrix, the input matrix being generated by arranging the inverse quantized residual coefficients of a two-dimensional form in the partial region in a one-dimensional form, and
   wherein a number of rows or columns of the inverse-transform matrix is greater than a number of the inverse-quantized residual coefficients included in the partial region.

2. The method of claim 1, wherein a size of the partial region is adaptively determined based on a size of the current block.

3. The method of claim 1, wherein a transform type for the primary inverse transform is determined based on index information signaled through a bitstream.

4. The method of claim 3, wherein the index information specifies any one of a plurality of transform sets,
   wherein a first transform type candidate included in the transform set is determined as a horizontal directional transform type of the current block, and
   wherein a second transform type candidate included in the transform set is determined as a vertical directional transform type of the current block.

5. The method of claim 1, wherein a transform type for the primary inverse transform is determined by comparing a width of the current block or a height of the current block with a threshold value.

6. A method of encoding an image, the method comprising:
   obtaining residual samples of a current block by subtracting prediction samples from original samples;
   performing a primary transform on residual samples of the current block;
   performing a secondary transform for the current block;
   quantizing transform coefficients generated as a result of the secondary transform; and
   encoding the quantized transform coefficients,
   wherein the secondary transform is performed for intermediate transform coefficients, resultant from the primary transform, included in a partial region of the current block,
   wherein the secondary transform is performed by using a transform matrix and an input matrix, the input matrix being generated by arranging the intermediate transform coefficients of a two-dimensional form in a one-dimensional form, and
   wherein a number of rows or columns of the transform matrix is less than a number of the intermediate transform coefficients included in the partial region.

7. A device for transmitting compressed video data, comprising:
   a processor configured to obtain the compressed video data; and
   a transmitter configured to transmit the compressed video data,
   wherein obtaining the compressed video data comprises:
   obtaining residual samples of a current block by subtracting prediction samples from original samples;
   performing a primary transform on residual samples of the current block;
   performing a secondary transform for the current block;
   quantizing transform coefficients generated as a result of the secondary transform; and
   encoding the quantized transform coefficients,
   wherein the secondary transform is performed for intermediate transform coefficients, resultant from the primary transform, included in a partial region of the current block,
   wherein the secondary transform is performed by using a transform matrix and an input matrix, the input matrix being generated by arranging the intermediate transform coefficients of a two-dimensional form in a one-dimensional form, and
   wherein a number of rows or columns of the transform matrix is less than a number of the intermediate transform coefficients included in the partial region.

* * * * *